G. R. VANDER WEE.
METHOD OF FORMING SAW TEETH.
APPLICATION FILED APR. 25, 1919.

1,371,008.

Patented Mar. 8, 1921.

Inventor
George R. Vander Wee,
By
Attorneys

G. R. VANDER WEE.
METHOD OF FORMING SAW TEETH.
APPLICATION FILED APR. 25, 1919.
1,371,008.
Patented Mar. 8, 1921.
2 SHEETS—SHEET 2.
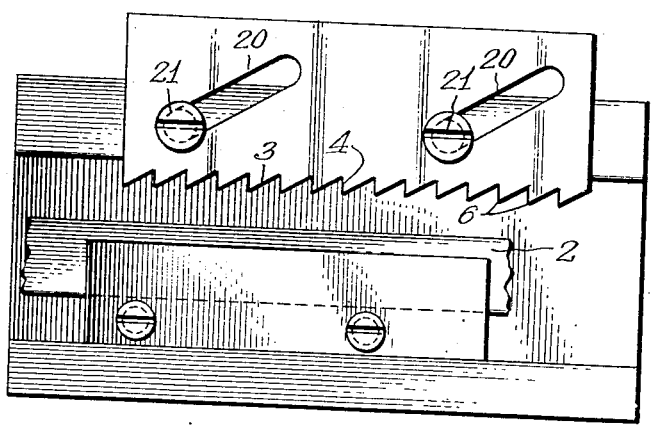
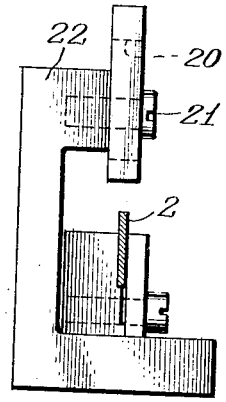
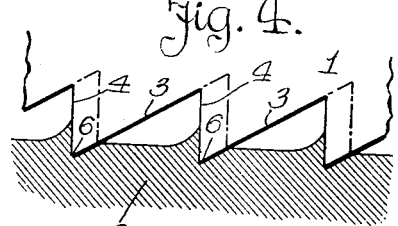
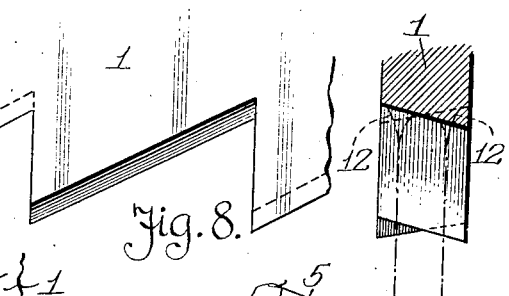
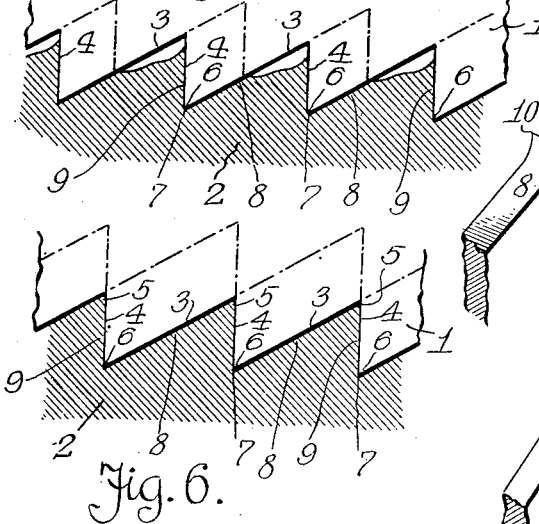
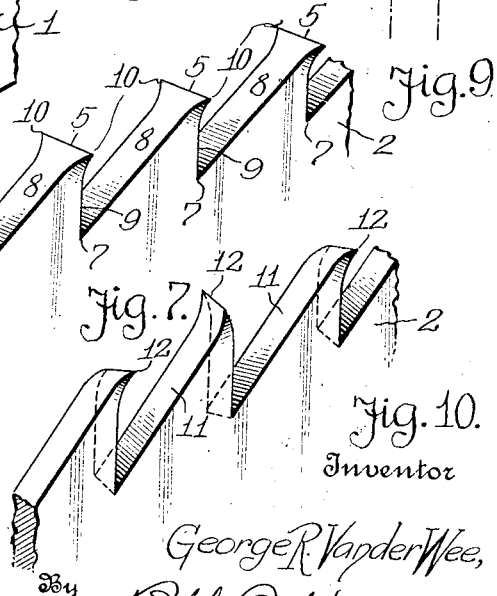
Inventor
George R. Vander Wee,
By
Attorneys

UNITED STATES PATENT OFFICE.

GEORGE R. VANDER WEE, OF DETROIT, MICHIGAN.

METHOD OF FORMING SAW-TEETH.

1,371,008.  Specification of Letters Patent.  Patented Mar. 8, 1921.

Application filed April 25, 1919. Serial No. 292,562.

*To all whom it may concern:*

Be it known that I, GEORGE R. VANDER WEE, a citizen of the United States of America, residing at Detroit, in the county of Wayne and State of Michigan, have invented certain new and useful Improvements in Methods of Forming Saw-Teeth, of which the following is a specification, reference being had therein to the accompanying drawings.

In the manufacture of saws it is common practice to blank out or otherwise cut away the metal from the blank to form the teeth, and where the metal is removed laterally by means of dies or otherwise in its blanking operation, a bur is formed upon one edge of the teeth only, which bur prevents the efficient operation of the saw. It is desirable that the finished saw teeth have a certain amount of "set" or lateral projection to afford clearance for the chips or material removed by the teeth in cutting, and as saws are usually made, this requires a separate operation.

In the manufacture of cheap saw blades having very fine teeth, such as saws for cutting metal, it is the usual practice to simply blank out the teeth but as before pointed out, this leaves a bur at one side only of the blade and not only hinders the efficient operation of the saw but causes it to run off instead of making a clean straight cut.

The object of the invention is to provide a method of manufacture which is just as rapid as blanking and wherein the teeth are formed with the proper clearance or "set" at both sides of the blade, and, further, wherein the metal of each tooth and particularly the cutting point thereof, is densified and thus made stronger and given better wearing qualities. A further object is to provide a method which is particularly adaptable to the manufacture of saws for cutting metal and the like having fine teeth and which, for the sake of cheapness are usually made by a single stamping or like operation without further finishing.

With the above and other ends in view the invention consists in the method as hereinafter more fully described and particularly pointed out in the appended claims, reference being had to the accompanying drawings as illustrative of the steps and manner in which they are taken in carrying out the invention.

Obviously any suitable device may be employed in carrying out the method, and as illustrative of a method or process embodying the invention and means which may be employed in carrying out such process, is illustrated in the accompanying drawings in which—

Fig. 2 is a detail view of a suitable former and holder, in elevation;

Fig. 3 is an end elevation of the same;

Figs. 4, 5 and 6 are enlarged successive details illustrative of the manner in which the teeth are formed;

Fig. 7 is an enlarged perspective view of the finished teeth;

Fig. 8 is an enlarged side elevation of a portion of a slightly modified former;

Fig. 9 is a transverse section of Fig. 8; and

Fig. 10 is a perspective view of teeth formed by the former shown in Figs. 8 and 9.

Figure 1:
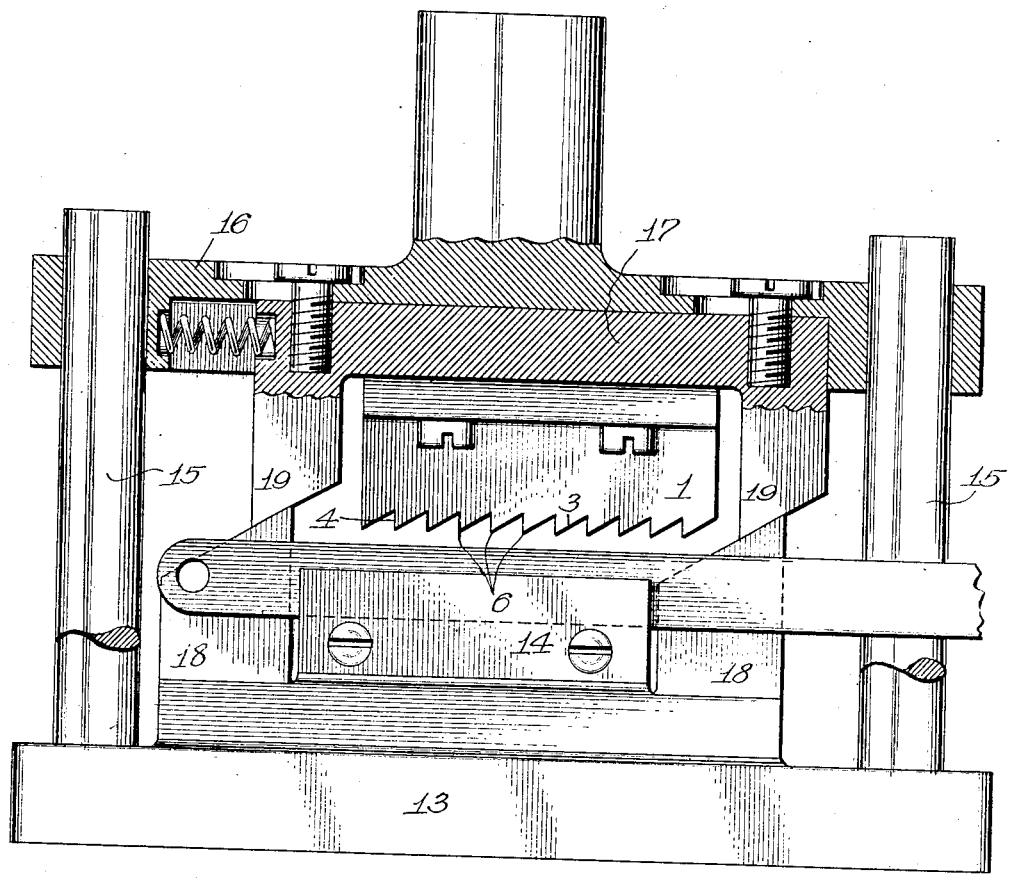
Figure 1 is a side elevation with parts broken away and in section of a device illustrative of suitable means for carrying out the invention.

This method or process of forming saw teeth consists in the displacement of the metal of the blank as distinguished from the common method of removing or cutting away portions of the blank, such displacement being performed in such a manner as to compress the metal at the forward or cutting edge of each tooth and cause it to flow to form a sharp point. This method also consists in so forming teeth that the metal will flow laterally at the points of the teeth to give clearance or set thereto, at the same time giving the proper form to the body of each tooth without increasing its thickness.

The operation is accomplished as illustrated in Figs. 4, 5 and 6 by providing a former 1 having an end portion shaped to conform to the outline or contour of a tooth or several teeth to be formed on the edge of a suitable blank 2, said former having an edge surface or surfaces 3 inclined to the horizontal and a vertical edge surface or surfaces 4 which meet the surfaces 3 in sharp angle corresponding accurately to the sharp cutting point 5 of each tooth to be formed, and the sharp outer angle or angles 6 formed by the meeting of the surfaces 3 and 4, corresponding to the angle or angles 7 at the base or root of each tooth to be formed, the length of the surfaces 3 and 4 corresponding exactly to the length of the inclined (8) and vertical or right angle (9) edges of the saw teeth, said former thus being provided with a forming tooth or teeth corresponding to the shape of the saw teeth to be formed.

By advancing the former in engagement with the edge of the blank, in a direction or inclined plane corresponding to the inclination of the inclined edges or backs 8 of the teeth to be formed, the sharp angle or angles 6 of the tooth shaped former cut into the edge of the blank, and as the former advances, the metal ahead of each former tooth in the direction of its inclined advance, or in contact with the edge 4, is compressed and caused to flow or move upwardly toward the inner angle of the former tooth, the metal of the blank being at the same time sheared or cut away to form the back 8 of the body of the saw tooth. The metal of the blank between the teeth is thus displaced in a direction longitudinally of the blank to partially form an adjacent saw tooth and at the same time is compressed, an adjacent tooth of the former providing a backing for the saw tooth being formed and also serving to confine the metal within the angle between the teeth of the former so that the point of the saw tooth will be accurately formed and the metal of said point compressed. The confining of the metal by the limits of the angle between the former teeth also causes the excess of metal to flow laterally adjacent the point of the saw teeth as at 10, Fig. 7, and thus the edge 5 of each tooth is longer than the thickness of the body, providing a cutting edge which gives clearance for the teeth.

If found desirable, the saw teeth may be formed with clearance or set as shown in Fig. 10, the point of one tooth being turned laterally to one side of the saw and the adjacent teeth being turned toward the other side. This is accomplished by forming the inclined side 11 of each former-tooth at an inclination to a transverse horizontal plane, said side of one former-tooth being inclined transversely in one direction, and the adjacent teeth in an opposite direction, so that the metal as it flows upwardly into the inner angle of the former-tooth to form the point of a saw-tooth, will be directed by such inclination toward one side of the blade only, as illustrated in Fig. 9, thus giving a set to the saw teeth alternately in opposite direction, as shown at 12 in Fig. 10.

As illustrative of simple means for holding the blank 2 and guiding the toothed-former 1 into proper engagement therewith to carry out the invention, a bed 13 is shown in Fig. 1, having means thereon such as a clamping plate 14 for firmly holding the blank 2 on edge and this base is also provided with vertical guide posts 15 for a head 16 which is vertically movable upon the posts. A slide 17 is attached to the head in any suitable manner to move endwise thereon and attached to this slide is the toothed former 1. On the base are studs or blocks 18 each formed with an upper guide face which is inclined to correspond with the inclination of the backs 8 of the saw tooth to be formed and on the slide 17 are lugs 19 having similarly inclined lower ends to engage the upper inclined faces on the blocks. A vertical downward movement of the head thus moves the slide endwise as it is carried downward by the head, and thus the teeth of the former 1 are brought into contact with the edge of the blank 2 and moved endwise as they cut into the blank, the plane of said movement being parallel with the surfaces 3 of the former-teeth, the end surfaces 4 of the former-teeth being maintained in vertical planes to force the metal longitudinally of the blank which is partially severed therefrom by the penetration of the sharp angles 6 into the edge of the blank.

Obviously, any suitable means may be employed to guide the former so that it will have the proper angular movement corresponding to the inclined sides of the teeth to be formed, another manner of guiding the former being shown in Figs. 2 and 3 wherein said former is provided with slots 20 extending in planes parallel to the planes of the inclined sides of the former-teeth, which former-teeth correspond exactly in outline to the saw teeth to be formed thereby, and providing pins 21 on a suitable support 22 to engage said slots.

Obviously any suitable means for guiding the former at the proper angle in its movement toward the blank will serve the purpose, and I do not limit myself to any other particular means or mechanism for carrying the process.

Having thus fully described my invention what I claim is:—

1. The method of making saws which consists in providing a blank and forming teeth on the edge of the blank by displacing the metal of said edge and simultaneously confining the displaced metal so as to define the outline of the tooth produced.

2. The method of making saws which consists in providing a blank and a member formed with a notch conforming to the desired outline of a tooth to be produced, and then forming said member against the edge of the blank to displace portions of the blank and form the displaced portions within said notch.

3. The method of making saws which consists in providing a blank and a member formed to conform to the desired outline of a plurality of teeth to be formed on the edge of the blank, and then forcing the formed portion of the member against the edge of the blank and displace and compress portions of the metal of the blank into a plurality of teeth having the desired tooth-form.

4. The method of making saws which consists in providing a metal blank and then displacing portions of the edge of the blank and simultaneously compressing the displaced metal and forming said portions to the desired tooth outline.

5. The method of making saws which consists in providing a metal blank and then displacing portions of the edge of the blank and simultaneously confining the displaced metal to the tooth outline the area of the displaced and confined metal being greater than the tooth area to cause a thickening of the tooth.

6. The method of making saws which consists in providing a metal blank and then displacing portions of the edge of the blank and simultaneously confining the displaced metal to form a plurality of teeth of the desired outline.

7. The method of making saws which consists in providing a blank and then bringing a former having a plurality of teeth into engagement with said edge in such a manner as to displace portions of said edge in the direction of its length and form said displaced portions into teeth of uniform contour within the spaces between the former-teeth.

8. The method of making saws which consists in providing a blank and then bringing a former having a plurality of teeth corresponding in section longitudinally of the former to the outline of a plurality of teeth to be formed, into engagement with said edge by a relative movement of said blank and former in a plane parallel with the plane of one side of the saw-tooth to be formed.

9. The method of making saws which consists in providing a blank and then forcing a former having a plurality of teeth corresponding in shape to the saw-teeth to be formed, into engagement with the edge of the blank by a relative movement of said former and blank toward each other and in a direction longitudinally of the blank.

10. The method of forming saw teeth on the edge of a metal blank which consists in displacing portions of said edge and simultaneously applying pressure thereto to compress the displaced portions into combination with adjacent portions and confining the metal to form teeth of uniform contour and desired outline.

11. The method of forming saw teeth on the edge of a metal blank which consists in displacing separate portions of said edge and causing by pressure the displaced portions to combine with intermediate portions in forming teeth, the metal of the displaced portions and intermediate portions being simultaneously shaped to give the desired tooth outline and caused to flow laterally at the points of the teeth to provide tooth clearance.

12. The method of forming saw teeth on the edge of a metal blank which consists in providing a former having a plurality of teeth conforming to the shape of teeth to be formed on the blank and driving the former-teeth into the edge of the blank to cause the metal displaced by the former-teeth to flow into and fill the spaces between said teeth and to be compressed within said spaces.

13. The method of forming saw teeth on the edge of a metal blank which consists in providing a former having a plurality of teeth moving the blank and former relatively to drive the former-teeth into the edge of the blank and simultaneously causing the metal displaced by the former-teeth to flow into the angles between said teeth and be compressed therein to thicken the formed teeth.

14. A former for saw-teeth comprising a member having teeth formed, each with a side inclined in a direction longitudinally and transversely of the former, and means for operating said former to drive its teeth into the edge of a metal blank.

In testimony whereof I affix my signature in the presence of two witnesses.

GEORGE R. VANDER WEE.

Witnesses:
 ANNA M. DORR,
 LEWIS E. FLANDERS.